United States Patent
Hyun

(10) Patent No.: US 8,568,631 B2
(45) Date of Patent: Oct. 29, 2013

(54) CONTROL METHOD FOR SCREW OF INJECTION MOLDING MACHINE

(75) Inventor: Chang Hoon Hyun, Anyang-si (KR)

(73) Assignee: LS MTRON Ltd., Anyang (KR)

( * ) Notice: Subject to any disclaimer, the term of this patent is extended or adjusted under 35 U.S.C. 154(b) by 177 days.

(21) Appl. No.: 13/193,819

(22) Filed: Jul. 29, 2011

(65) Prior Publication Data
US 2012/0193825 A1   Aug. 2, 2012

(30) Foreign Application Priority Data
Jan. 27, 2011 (KR) .................. 10-2011-0008288

(51) Int. Cl.
*B29C 45/50* (2006.01)
*B29C 45/76* (2006.01)

(52) U.S. Cl.
USPC ........................ 264/40.1; 425/145

(58) Field of Classification Search
USPC .............. 264/40.1, 40.7; 425/145, 149, 150
See application file for complete search history.

(56) References Cited

U.S. PATENT DOCUMENTS

| | | | | |
|---|---|---|---|---|
| 5,002,717 | A * | 3/1991 | Taniguchi | 264/328.1 |
| 5,756,037 | A * | 5/1998 | Kitamura | 264/328.1 |
| 6,464,488 | B2 * | 10/2002 | Dray | 425/562 |
| 7,578,952 | B2 * | 8/2009 | Shiozawa et al. | 264/40.5 |
| 2004/0091567 | A1 * | 5/2004 | Watanabe et al. | 425/561 |
| 2007/0196530 | A1 * | 8/2007 | Shiraishi et al. | 425/149 |
| 2008/0065356 | A1 * | 3/2008 | Kato et al. | 702/183 |
| 2008/0150181 | A1 * | 6/2008 | Maruyama et al. | 264/40.7 |

FOREIGN PATENT DOCUMENTS

JP     02-147312     * 6/1990

* cited by examiner

*Primary Examiner* — Jill Heitbrink
(74) *Attorney, Agent, or Firm* — LRK Patent Law Firm

(57) ABSTRACT

A screw control method of an injection molding machine including a barrel into which a resin is inserted, a screw installed to be rotatable inside the barrel, a check ring on a rear side of a screw head, and a controller controlling operations of the screw includes: measuring an amount of resin to be injected and inserting the resin into the barrel until the amount of resin reaches the measured amount of resin; completing the measurement while melting the inserted resin through rotation of the screw; stopping the rotation of the screw after completing the measurement of the resin; after retracting the screw of which the rotation is stopped a pre-set distance, advancing the screw a pre-set distance; and performing injection molding of the melted resin by advancing the screw, where the rotation, advance, and retraction operations of the screw are made according to control signals of the controller.

1 Claim, 3 Drawing Sheets

CONTROL METHOD FOR SCREW OF INJECTION MOLDING MACHINE

CROSS-REFERENCE TO RELATED APPLICATION

This application claims priority to Korean Patent Application No. 10-2011-0008288, filed on Jan. 27, 2011, and all the benefits accruing therefrom under 35 U.S.C. §119, the contents of which in its entirety are herein incorporated by reference.

BACKGROUND

1. Field

The present disclosure relates to a screw control method of an injection molding machine, and more particularly, to a screw control method capable of controlling the advance and retraction of a screw so as to uniformly distribute the internal pressure of a melted resin, thereby reducing variations in the weight of an injection product injected from the screw.

2. Description of the Related Art

In general, an injection apparatus is an apparatus for injecting a resin into a mold manufactured to be suitable for the shape of a product to be formed, and is an apparatus that melts resin granules in a solid state using mechanical energy generated by rotation of a screw installed in a barrel and heat energy generated by a heater mounted outside the barrel, and injects the melted resin into the mold manufactured to be suitable for the shape of the product to be formed so that the resin solidifies, thereby obtaining a product with a desired shape.

The screw installed in the barrel includes a screw part for transporting and melting the solid resin granules and a screw head part for preventing backflow of the resin when the melted resin is injected into the mold.

The granular resin supplied through a hopper is inserted into the barrel mounted with the heater, and the resin is melted in the barrel by shearing heat generated by the screw as the screw connected to a hydraulic motor or an electric motor is rotated and heat generated by the heater. Thereafter, the melted resin passes through the screw head and is accumulated on the front end portion of the head.

The screw transports the resin supplied through the hopper in a screw head direction while moving backward during transportation of the melted resin, such that the resin is continuously accumulated on the front end portion of the screw head. When the melted resin is continuously accumulated on the front end portion of the screw head to have a designated amount and measurement is completed, the screw stops rotating. Thereafter, the screw advances in the axial direction with pressure and speed corresponding to forming conditions and pushes the melted resin into the mold through a discharge opening of the barrel.

If a resin congestion occurs in the screw head part of the injection device, the detention time of the resin is lengthened, and oxidation or carbonation of the resin due to decomposition of polymer may occur.

According to the related art, after completing the measurement, the melted resin is injected as the screw immediately advances while stopping rotation. However, since the melted resin accumulated on the front end portion of the screw head is accumulated as the solid resin moves forward while being melted by the rotation of the screw, the pressure in the melted resin varies depending on the position. That is, since the melted resin farther from the screw head is generated earlier than the melted resin closer to the screw head and thus receives pressure of the melted resin that advances due to the rotation of the screw, the melted resin farther from the screw head has higher internal pressure than those of other parts.

When injection products are continuously made by injecting the melted resin in which pressure is not uniformly distributed, the weights of the injection products vary, resulting in degradation of reliability of products.

Therefore, there is a demand for a method of enhancing quality reliability of injection products by uniformalizing the pressure distribution depending on the position of a melted resin generated in an injection molding machine.

SUMMARY

The present disclosure is directed to providing a screw control method of an injection molding machine capable of, before injection molding of a resin that is melted and compressed inside an injection molding machine, reducing variations in pressure depending on the position of the melted resin by retracting and advancing a screw predetermined distances, and then advancing the screw to inject the melted resin, thereby reducing variations in the weights of injection products.

In one aspect, there is provided a screw control method of an injection molding machine which includes a barrel into which a resin is inserted, a screw that is installed to be rotatable inside the barrel, a check ring that is disposed on a rear side of a screw head to prevent backflow of the melted resin, and a controller that controls operations of the screw, the method including: measuring an amount of resin to be injected, and continuously inserting the resin into the barrel until the amount of resin reaches the measured amount of resin; completing the measurement while melting the resin inserted into the barrel through rotation of the screw; stopping the rotation of the screw after completing the measurement of the resin; after retracting the screw of which the rotation is stopped a pre-set distance, advancing the screw a pre-set distance again; and performing injection molding of the melted resin by advancing the screw, wherein the rotation, advance, and retraction operations of the screw are made according to control signals of the controller.

The pre-set retraction and advance distances of the screw may be set by an operation stroke (L) of the check ring.

The pre-set retraction distance of the screw with respect to the stroke distance (L) of the check ring may be equal to or greater than 1 L, and a difference between the retraction distance and the advance distance may be equal to or greater than 0.5 L.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION

Figure 1:
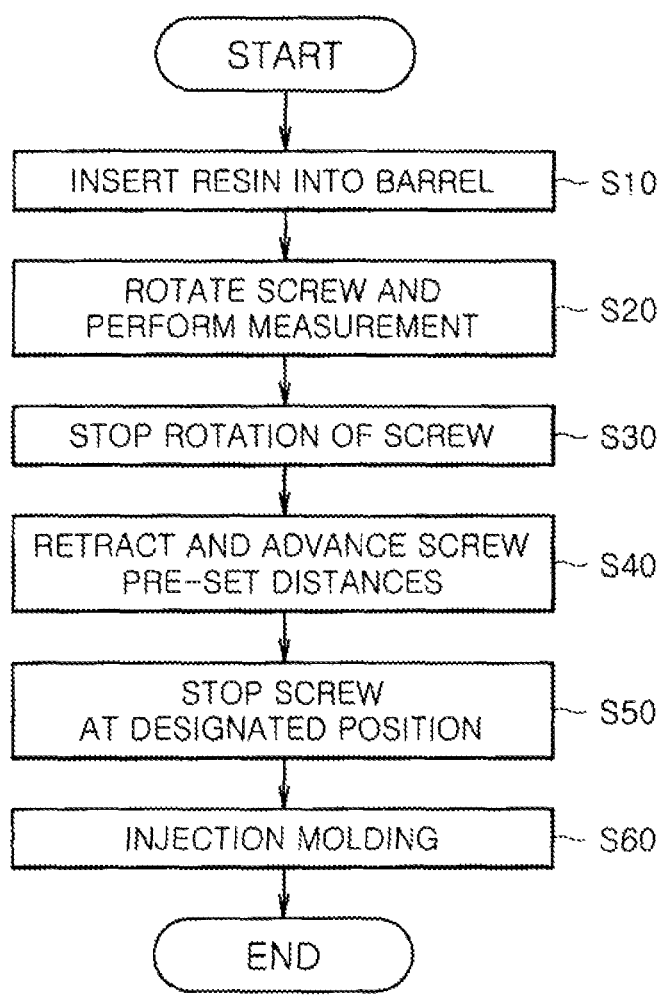
FIG. 1 is a flowchart of a screw control method of an injection molding machine according to an embodiment.

Exemplary embodiments now will be described more fully hereinafter with reference to the accompanying drawings, in which exemplary embodiments are shown. The present disclosure may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art. In the description, details of well-known features and techniques may be omitted to avoid unnecessarily obscuring the presented embodiments.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions; integers, steps operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals denote like elements. The shape, size and regions, and the like, of the drawing may be exaggerated for clarity.

A screw control method of an injection molding machine according to exemplary embodiments will now described in detail with reference to the accompanying drawings.

Figure 2:
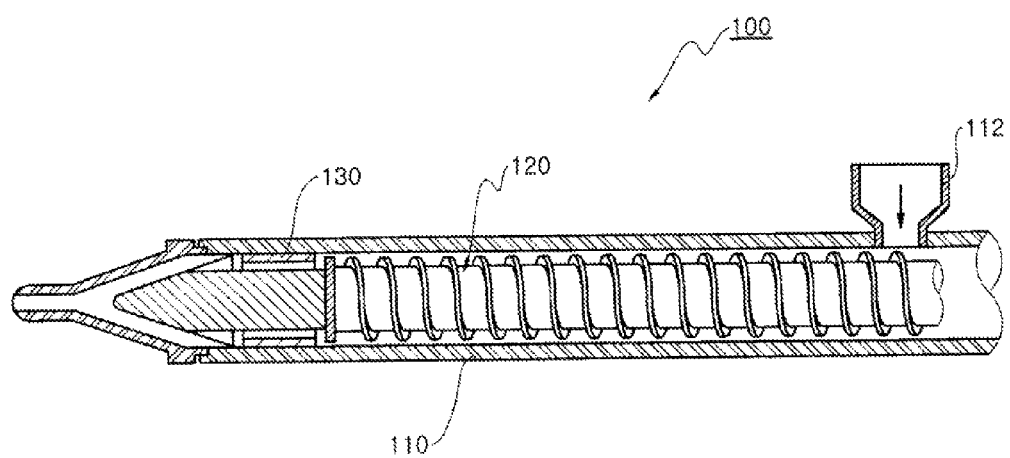
FIG. 2 is a diagram schematically illustrating the structure of an injection molding machine to which the screw control method according to the embodiment is applied.
Figure 3:
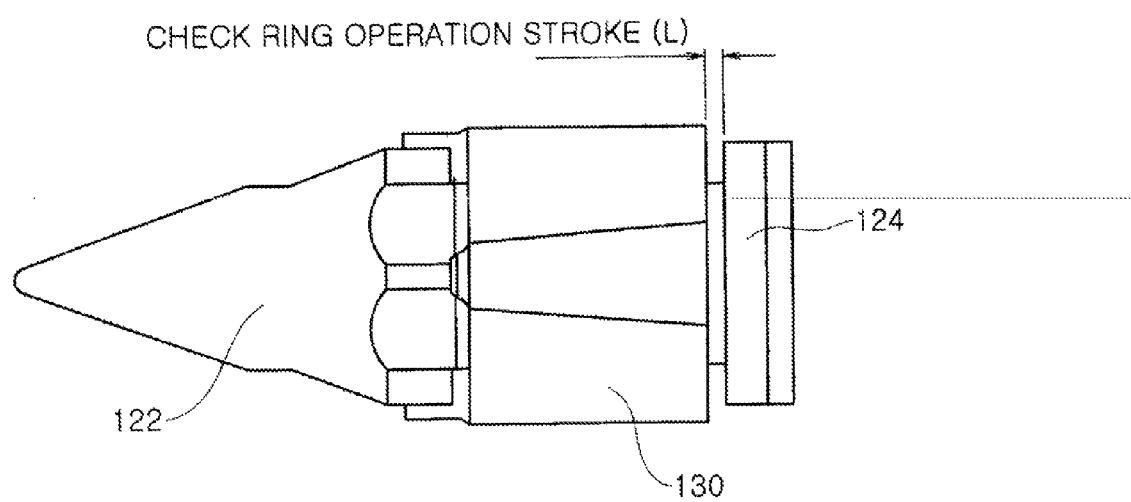
FIG. 3 is a diagram schematically illustrating the structure of a screw head assembly.

FIG. 1 is a flowchart of a screw control method of an injection molding machine according to an embodiment. FIG. 2 is a diagram schematically illustrating the structure of an injection molding machine to which the screw control method according to the embodiment is applied. FIG. 3 is a diagram schematically illustrating the structure of a screw head assembly.

Referring to FIGS. 1 to 3, the screw control method according to the embodiment is applied to an injection molding machine 100 including a barrel 110, a screw 120, a check ring 130, and a controller (not shown).

In the screw control method according to the embodiment, first, in a state where a mold (not shown) manufactured to be suitable for the shape of a product to be formed is disposed at the front end of the barrel 110, the amount of resin to be injected into the mold is measured, and the resin is continuously inserted into the barrel 110 until the amount of resin reaches the measured resin amount (S10). The resin is injected into the barrel 110 through an hopper 112 and is a solid resin.

Then, the solid resin moves to the front of the screw 120 while being melted by shearing heat that is generated by friction between the screw 120 and the solid resin as the screw 120 is rotated (S20). In order to accelerate the melting of the solid resin, the injection molding machine 100 includes a heater (not shown), and may operate the heater simultaneously with the rotation of the screw 120 so as to increase an amount of heat transferred to the solid resin.

When a designated amount of the melted resin is accumulated on the front end of the screw head 122 by the rotation of the screw 120 and measurement is completed, the rotation operation of the screw 120 is stopped (S30).

The check ring 130 is disposed on the rear side of the screw head 122 so as to prevent backflow of the melted resin that is moved toward the front end of the screw 120, and may retreat a predetermined distance due to the pressure of the melted resin accumulated on the front end of the screw head 122.

Subsequently, since the internal pressure of the melted resin accumulated on the front end of the screw head 122 varies depending on position at a time point when the rotation operation of the screw 120 is stopped, the screw 120 is retracted a pre-set distance so as to distribute the internal pressure of the resin and is advanced a pre-set distance again (S40). The retraction and advance distances of the screw 120 may be set depending on an operation stroke L of the check ring. The operation stroke L of the check ring represents a distance between the check ring 130 and a spacer 124. The pre-set retraction distance of the screw 120 has to be equal to or greater than 1 L at the minimum, and a difference between the advance distance and the retraction distance has to be equal to or greater than 0.5 L. For example, after the screw 120 retracts a distance of 2 L, the screw 120 may advance a distance of 1.5 L.

Between S30 and S40, an operation of forcibly retracting the screw (suck back) may further be included.

When the pre-set advance and retraction operations of the screw 120 are completed in S40, the screw 120 is stopped at a designated position and is put in an injection-standby state (S50). In a case of an injection molding machine according to the related art, there is only a suck back operation after the operation of completing screw measurement and thus the screw is on standby for injection in a state where the check ring is open. However, in the injection molding machine 100 according to the embodiment, the screw 120 can be on standby for injection in a state where the check ring 130 is closed by the advance and retraction operations of the screw 120. Therefore, according to the embodiment, during injection molding, a backflow phenomenon of the resin that occurs when the retraction operation of the check ring 130 is performed can be minimized, thereby reducing variations in the weights of molded products.

After the internal pressure of the melted resin is distributed by retracting and advancing the screw 120, the melted resin is injected and molded by advancing the screw 120 (S60).

The rotation, advance, and retraction operations of the screw 120 described above are made according to control signals of the controller, and values set in advance for the advance and retraction distances of the screw 120 may be stored in the controller.

The screw control method of an injection molding machine according to the present disclosure reduces, before injection molding of a resin that is melted and compressed inside the injection molding machine, variations in pressure depending on the position of the melted resin by retracting and advancing the screw the predetermined distances, and then advances the screw to inject the melted resin, thereby reducing variations in the weights of injection products.

While the exemplary embodiments have been shown and described, it will be understood by those skilled in the art that various changes in form and details may be made thereto without departing from the spirit and scope of the present disclosure as defined by the appended claims.

In addition, many modifications can be made to adapt a particular situation or material to the teachings of the present disclosure without departing from the essential scope thereof. Therefore, it is intended that the present disclosure not be limited to the particular exemplary embodiments disclosed as the best mode contemplated for carrying out the present disclosure, but that the present disclosure will include all embodiments falling within the scope of the appended claims.

What is claimed is:

1. A screw control method of an injection molding machine which includes a barrel into which a resin is inserted, a screw that is installed to be rotatable inside the barrel, a check ring that is disposed on a rear side of a screw head to prevent backflow of the melted resin, and a controller that controls operations of the screw, the method comprising:

measuring an amount of resin to be injected, and continuously inserting the resin into the barrel until the amount of resin reaches the measured amount of resin;

completing the measurement while melting the resin inserted into the barrel through rotation of the screw;

stopping the rotation of the screw after completing the measurement of the resin;

after retracting the screw of which the rotation is stopped a pre-set distance, advancing the screw a pre-set distance again; and performing injection molding of the melted resin by advancing the screw, wherein the rotation, advance, and retraction operations of the screw are made according to control signals of the controller, wherein the pre-set retraction and advance distances of the screw are set by an operation stroke (L) of the check ring, and wherein the pre-set retraction distance of the screw with respect to the stroke distance (L) of the check ring is equal to or greater than 1 L, and a difference between the retraction distance and the advance distance is equal to or greater than 0.5 L.

* * * * *